(12) United States Patent
Wang et al.

(10) Patent No.: US 10,637,805 B2
(45) Date of Patent: Apr. 28, 2020

(54) INSTANT MESSAGING METHOD, SERVER, AND STORAGE MEDIUM

(71) Applicant: TENCENT TECHNOLOGY (SHENZHEN) COMPANY LIMITED, Shenzhen (CN)

(72) Inventors: Gang Wang, Shenzhen (CN); Haiguang Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 46 days.

(21) Appl. No.: 15/728,060

(22) Filed: Oct. 9, 2017

(65) Prior Publication Data

US 2018/0034750 A1 Feb. 1, 2018

Related U.S. Application Data

(63) Continuation of application No. PCT/CN2016/093261, filed on Aug. 4, 2016.

(30) Foreign Application Priority Data

Aug. 14, 2015 (CN) .......................... 2015 1 0502395

(51) Int. Cl.
*H04L 12/58* (2006.01)
*H04L 12/18* (2006.01)

(52) U.S. Cl.
CPC .............. *H04L 51/04* (2013.01); *H04L 12/18* (2013.01); *H04L 12/185* (2013.01); *H04L 51/36* (2013.01)

(58) Field of Classification Search
None
See application file for complete search history.

(56) References Cited

U.S. PATENT DOCUMENTS

2010/0146065 A1* 6/2010 Zhu ...................... G06Q 10/107
                                                                 709/206
2011/0238766 A1* 9/2011 Lew .................. H04L 29/12896
                                                                 709/206

(Continued)

FOREIGN PATENT DOCUMENTS

CN         1842063 A        10/2006
CN         101079718        11/2007

(Continued)

OTHER PUBLICATIONS

International Search Report dated Oct. 26, 2016 in PCT/CN2016/093261 filed Aug. 4, 2016. (With English Translation).

(Continued)

*Primary Examiner* — Philip J Chea
*Assistant Examiner* — Hassan A Khan
(74) *Attorney, Agent, or Firm* — Oblon, McClelland, Maier & Neustadt, L.L.P.

(57) ABSTRACT

A method for messaging includes receiving, a group message sent from a terminal device that is used by a first user. The group message includes a first group identifier for identifying a member set of universal identifiers corresponding to a group of users on a messaging platform and a first user identifier for identifying the first user. The first user identifier is a universal identifier generated when the first user logs in the messaging platform using a first-type account of a first messaging service. Further, the method includes determining the member set to receive the group message based on the first group identifier and sending the group message to the group of users based on the universal identifiers in the member set. The member set includes a second user identifier generated when a second user logs in the messaging platform using a second-type account of a second messaging service.

18 Claims, 5 Drawing Sheets

(56) References Cited

U.S. PATENT DOCUMENTS

| | | | | |
|---|---|---|---|---|
| 2013/0151637 A1* | 6/2013 | Bedikian | .............. | H04L 67/22 |
| | | | | 709/206 |
| 2013/0275883 A1* | 10/2013 | Bharshankar | .......... | H04L 67/22 |
| | | | | 715/753 |
| 2015/0025977 A1* | 1/2015 | Doyle | ............... | G06Q 30/0269 |
| | | | | 705/14.66 |
| 2015/0032828 A1* | 1/2015 | Ordogh | .................. | H04L 51/00 |
| | | | | 709/206 |
| 2015/0244656 A1* | 8/2015 | Choi | ................. | H04N 21/4788 |
| | | | | 709/206 |

FOREIGN PATENT DOCUMENTS

| | | |
|---|---|---|
| CN | 101753475 | 6/2010 |
| CN | 102347916 | 2/2012 |
| CN | 103634195 | 3/2014 |
| WO | 2014027725 | 2/2014 |

OTHER PUBLICATIONS

Office Action dated Feb. 10, 2020 in Chinese Application No. 201510502395.X with partial English translation, 8 pages.

\* cited by examiner

INSTANT MESSAGING METHOD, SERVER, AND STORAGE MEDIUM

RELATED APPLICATION

This application is a continuation of International Application No. PCT/CN2016/093261, filed on Aug. 4, 2016, which claims priority to Chinese Patent Application No. 201510502395.X, filed with the Chinese Patent Office on Aug. 14, 2015 and entitled "INSTANT MESSAGING METHOD, SERVER, AND STORAGE MEDIUM". The entire disclosures of the prior applications are hereby incorporated by reference herein in their entirety.

FIELD OF THE TECHNOLOGY

This application relates to the field of computer technologies, and in particular, to an instant messaging method, a server, and a storage medium.

BACKGROUND OF THE DISCLOSURE

With the development of computer technologies, instant messaging software has become an important means for people to communicate with each other. As there are various types of instant messaging software, different users may select different communications software. During communication, a user logging in by using an account of a particular type of instant messaging software can only communicate with other users logging in by using the same type of accounts.

Existing instant messaging methods do not support mutual communication between users that use different types of accounts. A user using a first-type account needs to register a second-type account if the user needs to communicate with a user using a second-type account. Because a large quantity of account information easily causes confusion, users using different types of accounts cannot interact with others conveniently.

SUMMARY

According to embodiments disclosed in this application, an instant messaging method, a server, and a storage medium are provided.

Aspects of the disclosure provide a method for messaging. The method includes receiving, by an information processing apparatus that provides a messaging platform, a group message sent from a terminal device that is used by a first user. The group message includes a first group identifier for identifying a member set of universal identifiers corresponding to a group of users on the messaging platform and a first user identifier for identifying the first user. The first user identifier is a universal identifier generated when the first user logs in the messaging platform using a first-type account of a first messaging service. Further, the method includes determining the member set to receive the group message based on the first group identifier and sending the group message to the group of users on the messaging platform corresponding to the universal identifiers in the member set. The member set includes a second user identifier generated when a second user logs in the messaging platform using a second-type account of a second messaging service.

In an embodiment, before the step of receiving the group message sent from the terminal device that is used by the first user, the method includes receiving a first message with the first user identifier, obtaining the first group identifier, adding the first user identifier to the member set that is identified by the first group identifier, and sending the first group identifier to the terminal device that is used by the first user.

In another embodiment, before the step of receiving the group message sent from the terminal device that is used by the first user, the method includes receiving a first login request of the first user that logs in the messaging platform using the first-type account for the first messaging service, generating the first user identifier for identifying the first user according to the first login request, and sending the first user identifier to the terminal device that is used by the first user to log in the messaging platform, receiving a second login request of the second user that logs in the messaging platform by using the second-type account of the second messaging service, generating the second user identifier for identifying the second user according to the second login request, and sending the second user identifier to a second terminal device that is used by the second user to log in the messaging platform, receiving a second message with the second user identifier, obtaining the first group identifier, adding the second user identifier to the member set that is identified by the first group identifier, and sending the first group identifier to the second terminal.

In an example, the step of generating the first user identifier for identifying the first user according to the first login request includes obtaining an authentication code corresponding to the first-type account, and sending a verification request to an account server for the first messaging service. The verification request includes the authentication code. Further, the method includes receiving a verification result from the account server that performs verification based on the verification request and generating the first user identifier for identifying the first user when the verification result is indicative of a verification success.

In an embodiment, after the steps of sending the first user identifier to the first terminal and sending the first group identifier to the second terminal device, the method includes sending member data of the member set that is identified by the first group identifier to one or more terminal devices that are used by the group of users for the one or more terminal devices to display member information according to the member data.

In an embodiment, the method includes receiving a private message sent by the terminal device that is used by the first user, the private message including the first user identifier and the second user identifier; and sending the private message to the second user corresponding to the second user identifier.

Aspects of the disclosure provide an information processing apparatus that includes interface circuitry and processing circuitry. The interface circuitry is configured to receive a group message sent from a terminal device that is used by a first user. The group message includes a first group identifier for identifying a member set of universal identifiers corresponding to a group of users on a messaging platform and a first user identifier for identifying the first user. The first user identifier is a universal identifier generated when the first user logs in the messaging platform using a first-type account of a first messaging service. The processing circuitry is configured to determine the member set to receive the group message based on the first group identifier and send the group message to the group of users corresponding to the universal identifiers in the member set via the interface circuitry. The member set includes a second user identifier generated when a second user logs in the messaging platform using a second-type account for a second messaging service.

Aspects of the disclosure provide a non-transitory computer-readable medium storing instructions which when executed by a computer causes the computer to perform a method for messaging. The method includes receiving, a group message sent from a terminal device that is used by a first user. The group message includes a first group identifier for identifying a member set of universal identifiers corresponding to a group of users on a messaging platform and a first user identifier for identifying the first user. The first user identifier is a universal identifier generated when the first user logs in the messaging platform using a first-type account of a first messaging service. The method further includes determining the member set to receive the group message based on the first group identifier, and sending the group message to the group of users corresponding to the universal identifiers in the member set members, the member set includes a second user identifier generated when a second user logs in the messaging platform using a second-type account of a second messaging service.

Details of one or more embodiments of this application are provided in the following accompanying drawings and description. Other features, objectives and advantages of this application will become obvious from the specification, accompanying drawings and claims.

BRIEF DESCRIPTION OF THE DRAWINGS

To illustrate the technical solutions in the embodiments of this application or in the existing technology more clearly, the following briefly introduces the accompanying drawings required for describing the embodiments or the existing technology. The accompanying drawings in the following description show merely some embodiments of this application, and persons of ordinary skill in the art may still derive other drawings from these accompanying drawings.

DESCRIPTION OF EMBODIMENTS

Figure 1:
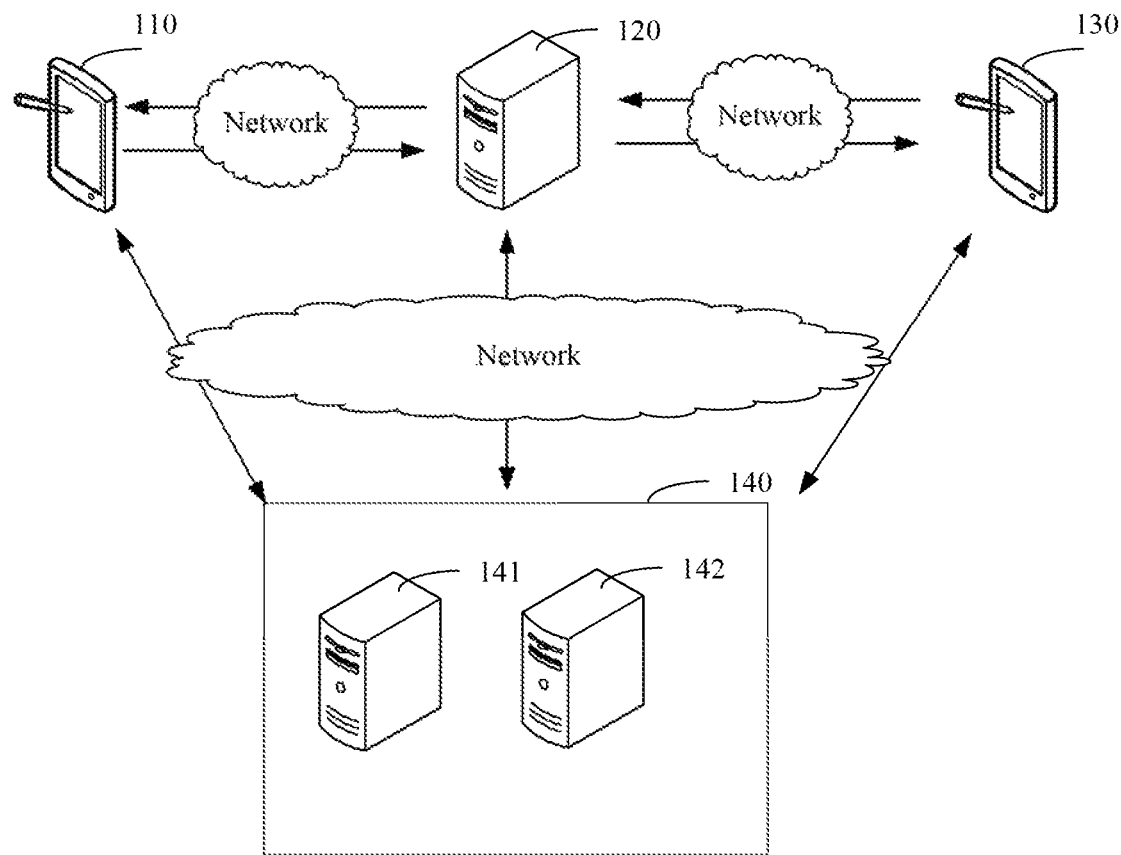
FIG. 1 is a diagram of an application environment where an instant messaging method is performed according to an embodiment.

FIG. 1 is a diagram of an application environment where an instant messaging method is performed according to an embodiment. The application environment includes a terminal 110, a platform server 120, a terminal 130 and an account server 140. Both the terminal 110 and the terminal 130 can communicate with the platform server 120 and the account server 140 through a network.

The terminal 110 and the terminal 130 may be smartphones, tablet computers, laptops, desktop computers, or the like, which are not limited herein. The terminal 110 and the terminal 130 may use different types of accounts to log in to the platform server 120 and establish connection to communicate with each other through the platform server 120. The account server 140 may include multiple servers such as a first account server 141 and a second account server 142 which are of different types, and the account server 140 can respond to requests sent by the terminal 110, the terminal 130, and the platform server 120. The terminal 110 and the terminal 130 use account servers corresponding to the types of accounts to perform authentication when the terminal 110 and the terminal 130 use different types of accounts to log in.

Figure 2:
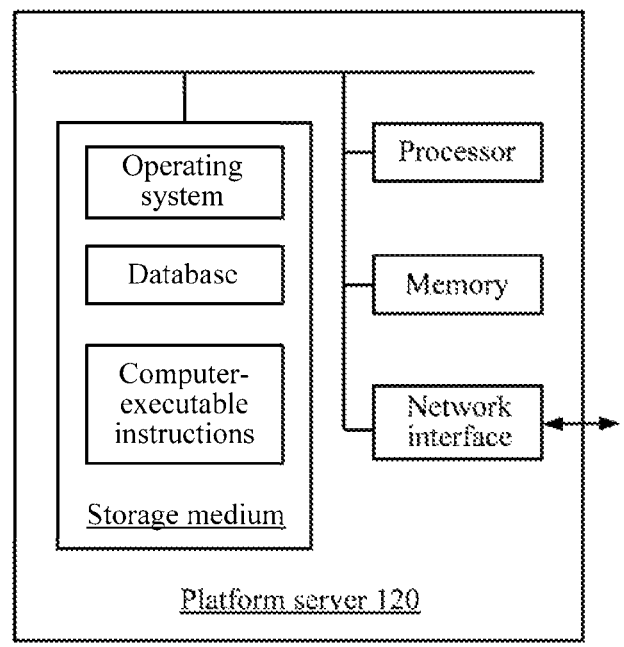
FIG. 2 is an internal structural diagram of a platform server in FIG. 1 according to an embodiment.

In one embodiment, an internal structure of the platform server 120 in FIG. 1 is shown in FIG. 2. The platform server 120 includes a processor, a storage medium, a memory and a network interface that are connected by a system bus. An operating system, a database and computer-executable instructions are stored in the storage medium of the server 120. The database is configured to store data such as a room identifier and a user identifier. When the instructions are executed by the CPU, an instant messaging method applicable to the platform server 120 can be performed. The processor of the platform server 120 is configured to provide calculation and control capability so as to support the operation of the entire platform server 120. The memory of the platform server 120 provides an environment for the running of the computer-executable instructions in the storage medium. The network interface of the platform server 120 is configured to communicate with the external terminal 110, terminal 130, and account server 140 through a network. For example, the network interface receives a request sent by the terminal 110 and returns data to the terminal 110.

Figure 3:
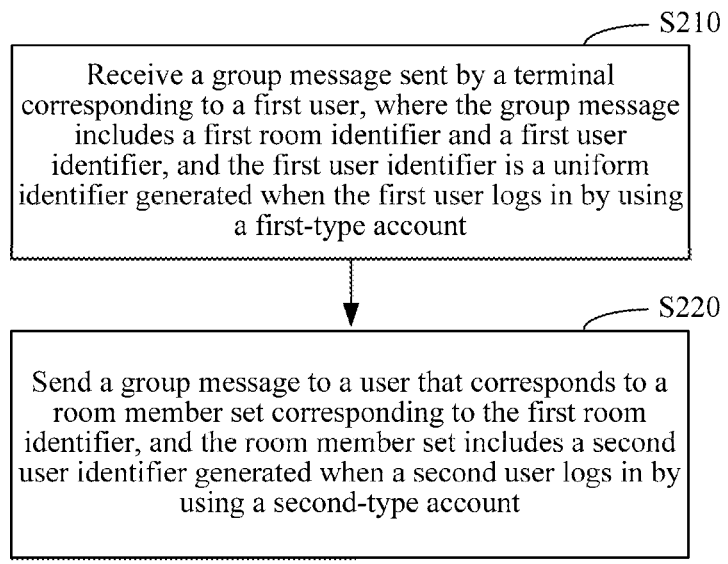
FIG. 3 is a flowchart of an instant messaging method according to an embodiment.

As shown in FIG. 3, an instant messaging method is provided in an embodiment and, using the platform server applied to the foregoing application environment as an example, the method includes the following steps:

Step S210: Receive a group message sent by a terminal corresponding to a first user. The group message includes a first room identifier and a first user identifier, and the first user identifier is a uniform identifier generated when the first user logs in by using a first-type account.

Specifically, a room identifier is used to identify a room, so the first room identifier is used to identify the first room. A room is a place provided for multiple different users to communicate with each other, and other users in the room can receive and display a message sent by a user in the room. A user identifier is used to identify a user, the first user identifier is used to identify the first user, and the first user identifier is a uniform identifier generated when the first user logs in by using a first-type account. The group message includes the first room identifier and the first user identifier, a corresponding first room can be obtained according to the first room identifier, and a source of a message can be known according to the first user identifier. Because different users may log in a platform by using different types of accounts, after the login, a uniform identifier different from the original account is generated to identify all users of different types of accounts uniformly, so that the platform performs message forwarding according to the uniform identifier. There are many types of accounts such as an instant messaging account and a social application account. When a user logs in by using different types of accounts, original login information of an account such as a user name and passwords may be used, and the user does not need to register a new account on the platform, making the login process simple and convenient. It can be understood that an account server corresponding to a first-type account may be used to verify whether the first-type account is an authorized account that can log in.

Step S220: Send the group message to a user that corresponds to a room member set corresponding to the first room identifier. The room member set includes a second user identifier generated when a second user logs in by using a second-type account.

Specifically, user identifiers of all users in the room are recorded in the room member set, and all users in the room can be obtained according to the room member set. The user identifiers, generated when different types of accounts are used to log in, are included in the room member set, for example, the second user identifier generated by the second user using the second-type account to log in is included. The first-type account and the second-type account are different types of accounts, and users of different types of accounts may communicate with each other by sending the group message to users corresponding to the room member set corresponding to the first room identifier. In addition, a message sent by a user can be received by all users in the room and be displayed in a same interface, which further improves the convenience during communication among users of different types of accounts, and is applicable to a scenario where multiple users need to communicate but types of accounts used by the users are difficult to be uniform, for example, a teaching or discussion scenario such as a teaching class application and academic discussion application. In one embodiment, a user identifier in a room member set has a corresponding permission level, and a group message is sent to users corresponding to a user identifier of which a permission level meets a preset condition in the room member set that correspond to the first room identifier. A receiver of the group message may be distinguished according to the permission level, making the forwarding of the group message more flexible. An administrator can set in advance permission levels corresponding to all user identifiers. In one embodiment, a guest user identifier generated by a guest identity is included in the room member set, and the group message is sent to the user corresponding to the guest user identifier. The user corresponding to the guest user identifier can receive the group message, but cannot send a group message, so that a user without an account can receive a group message without registering an account.

In this embodiment, by receiving a group message sent by a terminal corresponding to the first user, the group message including a first room identifier and a first user identifier, and the first user identifier being a uniform identifier generated when the first user logs in by using a first-type account, the group message is sent to a user that corresponds to a room member set corresponding to the first room identifier. The room member set includes a second user identifier generated when a second user logs in by using a second-type account, and a uniform user identifier generated when different types of accounts logs in. The group message of the first user is forwarded to users corresponding to the room member set, so that users of different types of accounts can communicate with each other, and the group message of the first user can be received by users corresponding to the room member set, bringing more convenience to users of different types of accounts during communication.

Figure 4:
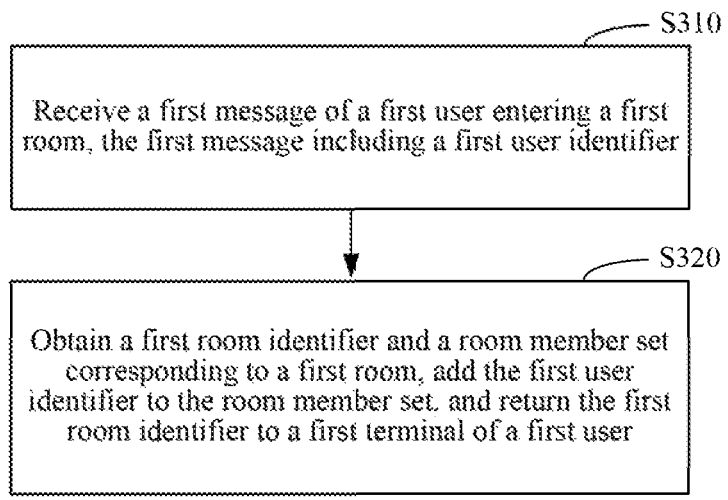
FIG. 4 is a flowchart of a first user entering a room according to an embodiment.

In one embodiment, as shown in FIG. 4, before step S210, the method further includes:

Step S310: Receive a first message of the first user entering a first room. The first message includes the first user identifier.

Specifically, when the first user enters the first room, a terminal of the first user sends the first message to notify the platform server, and the platform server receives the first message that includes the first user identifier which is configured to identify which room the first user enters. A user may select any room to enter by clicking a room, and different users correspond to different room permissions. In one embodiment, after the receiving a first message of the first user entering a first room, the method further includes: obtaining a room permission of the first user, determining whether the room permission of the first user meets a condition to enter the first room. If yes, Step S320 is performed; if not, notification of failing to enter the room is returned to the first terminal of the first user.

Step S320: Obtain the first room identifier and the room member set corresponding to the first room, add the first user identifier to the room member set, and return the first room identifier to the first terminal of the first user.

Specifically, when a new user enters a room, a room identifier corresponding to the new user is added to the room member set, making it convenient for a terminal of users in the room to update in time a list of new members according to the updated room member set. The first room identifier is returned to the first terminal of the first user, so that the first user, when sending a group message later, carries the first room identifier, enabling the platform server to obtain an objective target of a forwarded message according to the first room identifier.

Figure 5:
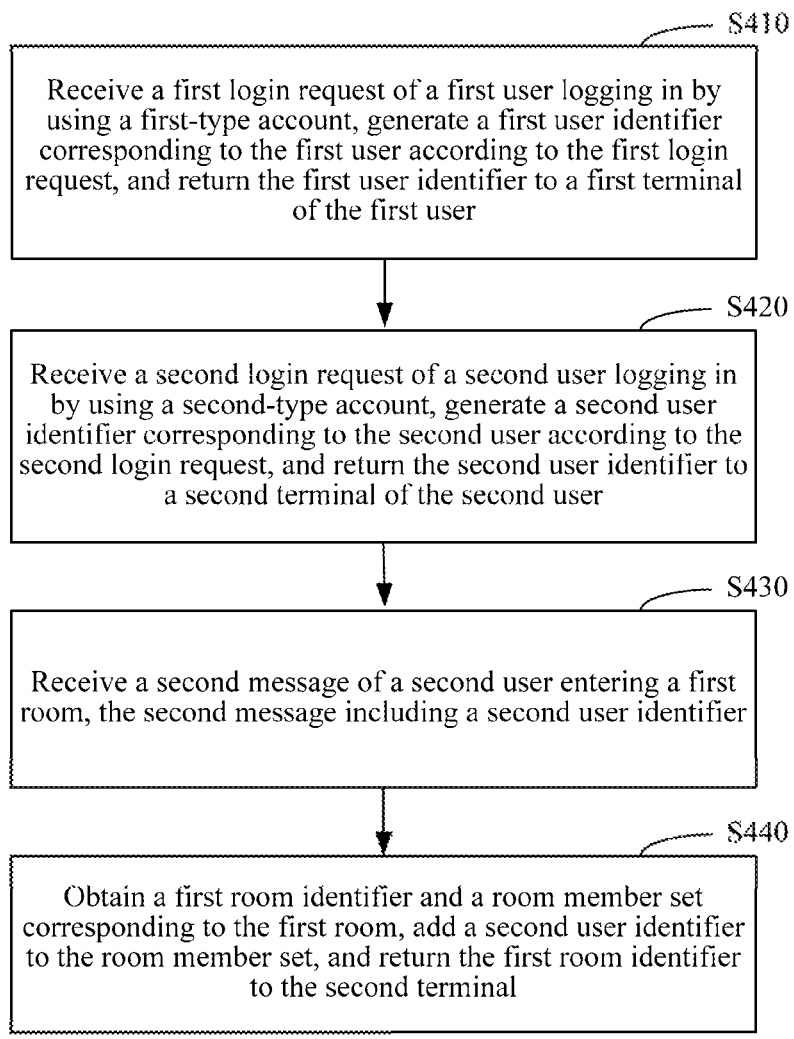
FIG. 5 is a flowchart of logging in by using different types of accounts and a second user entering a room according to an embodiment.

In one embodiment, as shown in FIG. 5, before step S210, the method further includes:

Step S410: Receive a first login request of the first user logging in by using the first-type account, generate the first user identifier corresponding to the first user according to the first login request, and return the first user identifier to the first terminal of the first user.

Specifically, a login request includes the type of an account. The type of the account is a first type because the first user uses the first-type account. The login request further includes account information such as a user name and passwords. Account information of the first-type account is sent to a server of the first-type account for verification. If verification succeeds, the first user identifier corresponding to the first user is generated. The first user identifier is a uniform identifier generated by the platform server for users logging in by using different types of accounts. The first user may pull data corresponding to the first user identifier by sending the first user identifier to the platform server, such as a historical class record and historical room information, the platform server may customize a displaying page for the first user after the login according to historical browsing information of the first user identifier. For example, a corresponding type of room information is identified according to a room that the first user identifier enters. Corresponding information in the database is searcher for by the platform server and returned to the first terminal of the first user.

Step S420: Receive a second login request of the second user logging in by using the second-type account, generate the second user identifier corresponding to the second user according to the second login request, and return the second user identifier to the second terminal of the second user.

Specifically, the second user logs in by using an account different from the first user, account information of the second-type account is sent to a server of the second-type account for verification. If verification succeeds, the second user identifier corresponding to the second user is generated. The second user identifier is a uniform identifier generated by the platform server for users logging in by using different types of accounts. The second user identifier is returned to the second terminal of the second user, so that the second user may pull data corresponding to the second user identifier according to the second user identifier. Although the type of the login account of the first user is different from that of the second user, the platform server generates a uniform user identifier which the platform server can recognize for users who are verified by the platform server so that a user may not be affected by the type of account when communicating and operating in the platform server by using the user identifier.

Step S430: Receive a second message of the second user entering the first room. The first message includes the first user identifier.

Step S440: Obtain the first room identifier and the room member set corresponding to the first room, add the second user identifier to the room member set, and return the first room identifier to the second terminal.

Specifically, the second user enters the first room before the first user enters the first room, so that the first user can conveniently communicate with the second user when the first user enters the same room later.

Figure 6:
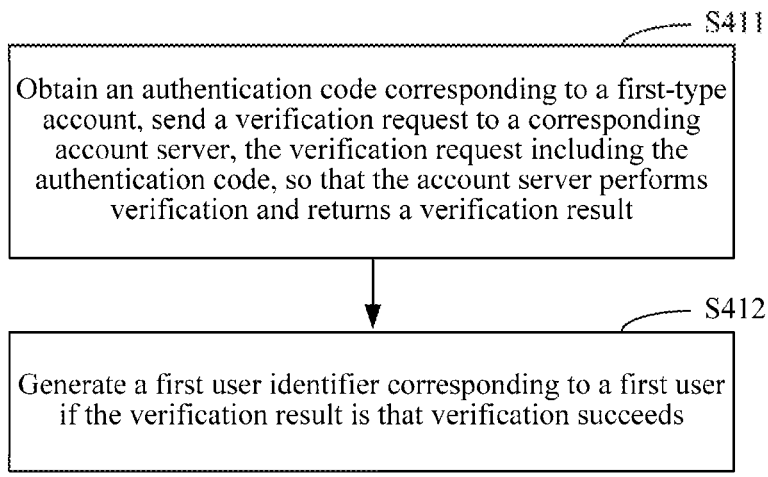
FIG. 6 is a flowchart of generating a first user identifier according to an embodiment.

In one embodiment, as shown in FIG. 6, step S410 includes:

Step S411: Obtain an authentication code corresponding to the first-type account, send a verification request to a corresponding account server, the verification request including the authentication code, so that the account server performs verification and returns a verification result.

Specifically, the platform server performs subsequent verification by being accessed to an SDK (Software Development Kit, software development kit) provided by an account server and only an SDK accessed platform server has a corresponding authentication code. When the first user logs in the platform server by using the first-type account, an authentication code corresponding to the platform server is obtained from the first-type account server firstly, the authentication code is later sent to the platform server. The platform server sends a verification request, the authentication code included, to a corresponding account server; the account server verifies whether the authentication code matches the platform server, and whether account information of the user is right, and returns a verification result to the platform server. Only if the authentication code matches the platform server and the account information is right, the verification result is that verification succeeds. By matching the platform server and the authentication code, even if the authentication code is intercepted by a malicious server, verification fails because the malicious server does not match the authentication code.

Step S412: Generate a first user identifier corresponding to a first user if a verification result is that verification succeeds.

Specifically, if the verification succeeds, account information stored in the account server by the first-type account can be obtained, such as a user profile picture and user documentation information. Account information of the first user is associated with the first user identifier, so that the platform server may directly use the information.

In one embodiment, after step S320 and step S440, the method further includes: returning member data of a room member set corresponding to the first room identifier to a terminal of a user corresponding to the room member set, so that the terminal displays member information according to the member data.

Specifically, if a new member enters the first room, member data of a room member set corresponding to the first room identifier is returned to a terminal of a user corresponding to the room member set, so that the terminal displays user information of a new member according to the member data, and user information is updated in time. When the member data is returned, member data of a newly-added member can be just returned to reduce traffic.

In one embodiment, the method further includes: receiving a private message sent by a terminal corresponding to the first user, where the private message includes a first user identifier and a second user identifier; and send the private message to a user corresponding to the second user identifier.

Specifically, the first terminal of the first user receives a message sending target selected by clicking a profile picture or an icon, obtains a second user identifier corresponding to the profile picture or the icon, and sends a private message, the first user identifier and the second user identifier included, to the platform server. The platform server determines a message forwarding target according to the second user identifier and sends the message to a second terminal of the second user. The first user identifier may be included in the sent message, so that the second terminal displays a message source. A user in a room may have private communication by sending a private message, and the message during communication will not be sent to other users in the room, so that a user may flexibly and conveniently select the communication way among users.

Figure 7:
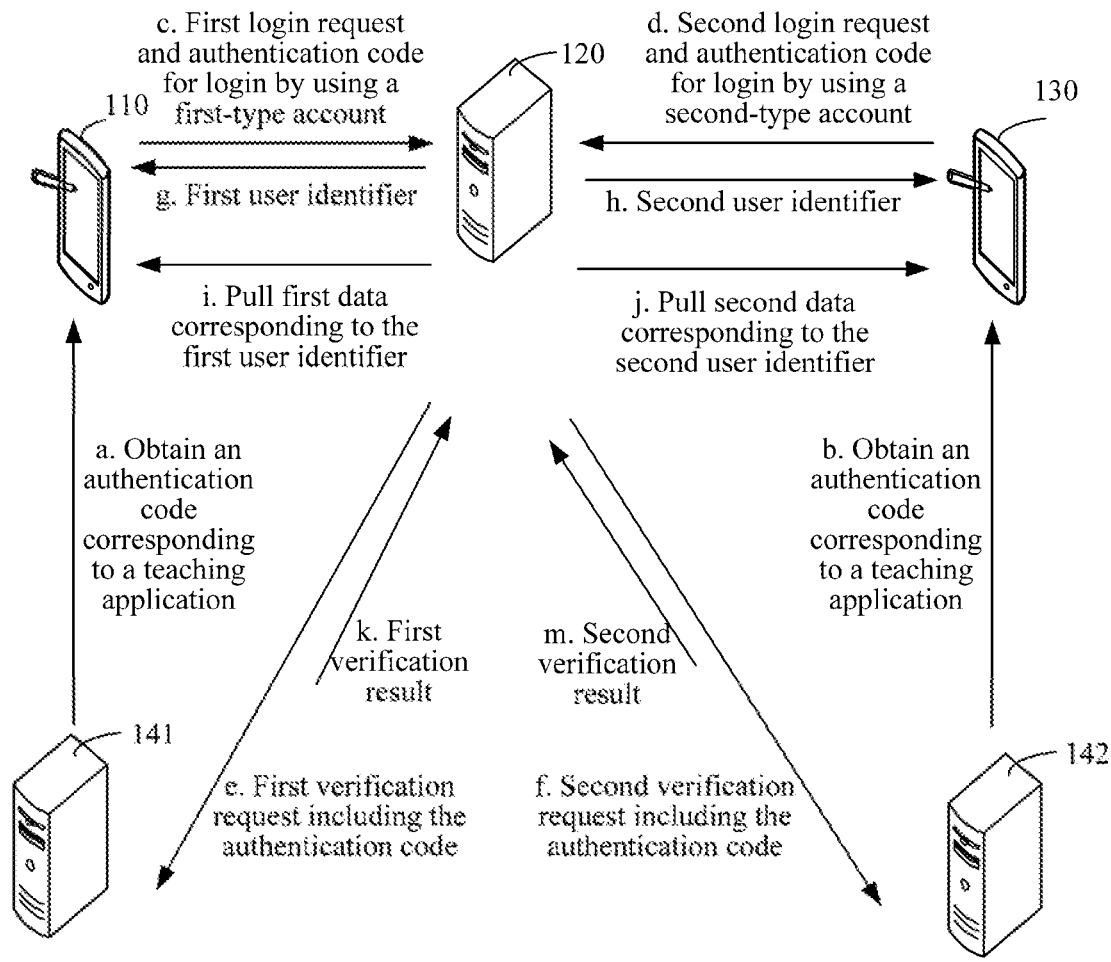
FIG. 7 is an schematic interaction diagram of a terminal, a platform server, and an account server according to an embodiment.

In a specific embodiment, with reference to FIG. 7, an instant messaging method includes the following steps:

The first user with a first terminal (e.g., the terminal 110) obtains, from a first account server (e.g., the first account server 141), an authentication code corresponding to a teaching application (shown as "a" in FIG. 7), and sends to a teaching server (e.g., the platform server 120), by the teaching application installed in the first terminal, the first login request and the authentication code by using the first-type account to log in (shown as "c" in FIG. 7).

The second user with a second terminal (e.g., the terminal 130) obtains, from a second account server (e.g., the second account server 142), an authentication code corresponding to a teaching application (shown as "b" in FIG. 7), and sends to the teaching server (e.g., the platform server 120), by the teaching application installed in the second terminal, the second login request and the authentication code by using the second-type account to log in (shown as "d" in FIG. 7).

The teaching server sends a first verification request, the authentication code included, to the first account server (shown as "e" in FIG. 7).

The teaching server sends a second verification request, the authentication code included, to the second account server (shown as "f" in FIG. 7).

The teaching server receives a first verification result returned by the first account server (shown as "k" in FIG. 7); if verification succeeds, the first user identifier is generated and is returned to the first terminal (show as "g" in FIG. 7).

The teaching server receives a second verification result returned by the second account server (shown as "m" in FIG.

7); if verification succeeds, the second user identifier is generated and is returned to the second terminal (shown as "h" in FIG. 7).

The first user pulls corresponding first data from the teaching server by using the first user identifier (shown as "i" in FIG. 7).

The second user pulls corresponding second data from the teaching server by using the second user identifier (shown as "j" in FIG. 7).

The teaching server receives a second message of the second user entering a first room, the second message including the second user identifier, obtains a first room identifier and a room member set corresponding to the first room, adds the second user identifier to the room member set, and returns member data of the first room identifier and the room member set to the second terminal.

The teaching server receives a first message of the first user entering a first room, the first message including the first user identifier, obtains a first room identifier and a room member set corresponding to the first room, adds the first user identifier to the room member set, returns member data of the first room identifier and the room member set to the first terminal, and returns member data corresponding to a newly-added first user identifier in the room member set to the second terminal.

The teaching server receives a group message sent by the first user, the group message includes the first room identifier and the first user identifier, and the teaching server sends the group message to the first terminal and the second terminal.

The teaching server receives a private message sent by the first user, the private message includes the first user identifier and the second user identifier, and the teaching server sends the private message to the second terminal.

Figure 8:
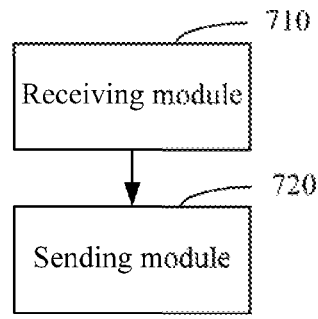
FIG. 8 is a structural block diagram of a server according to an embodiment.

In one embodiment, as shown in FIG. 8, a server is provide, including a memory and a processor, and the memory stores instructions, when executed by the processor, the server includes:

a receiving module 710, configured to receive a group message sent by a terminal corresponding to a first user, the group message including a first room identifier and a first user identifier, and the first user identifier being a uniform identifier generated when the first user logs in by using a first-type account; and a sending module 720, configured to send a group message to a user corresponding to a room member set corresponding to the first room identifier, and the room member set includes a second user identifier generated when the second user logs in by using a second-type account.

Figure 9:
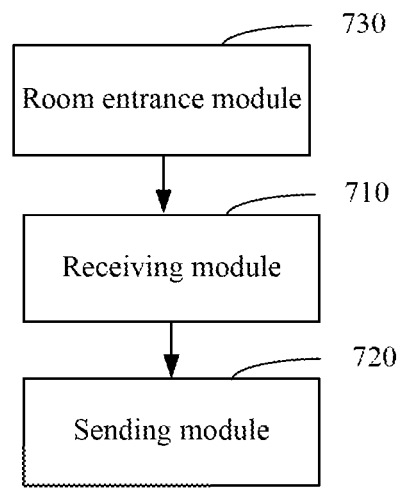
FIG. 9 is a structural block diagram of a server according to another embodiment.

In one embodiment, as shown in FIG. 9, the server further includes:

a room entrance module 730, configured to receive a first message of the first user entering the first room, the first message including the first user identifier, obtain the first room identifier and the room member set corresponding to the first room, add the first user identifier to the room member set, and return the first room identifier to the first terminal of the first user.

Figure 10:
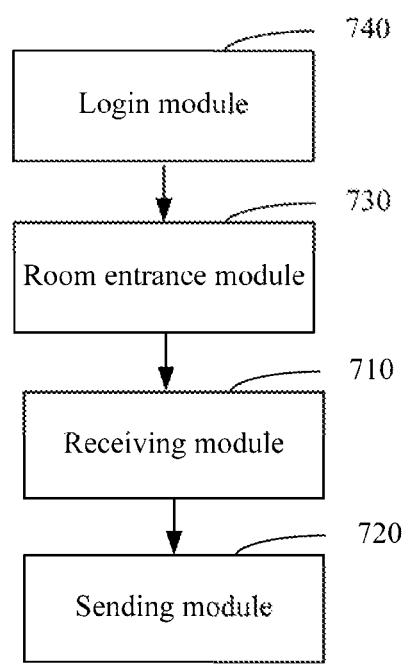
FIG. 10 is a structural block diagram of a server according to still another embodiment.

In one embodiment, as shown in FIG. 10, the server further includes:

a login module 740, configured to receive a first login request of the first user logging in by using the first-type account, generate the first user identifier corresponding to the first user according to the first login request, and return the first user identifier to a first terminal of the first user; receive a second login request of the second user logging in by using the second-type account, generate the second user identifier corresponding to the second user according to the second login request, and return the second user identifier to a second terminal of the second user.

The room entrance module 730 is further configured to: receive a second message of the second user entering the first room, the second message including the second user identifier, obtain the first room identifier and the room member set corresponding to the first room, add the second user identifier to the room member set, and return the first room identifier to the second terminal.

In one embodiment, the login module 740 is further configured to: obtain an authentication code corresponding to the first-type account, send an verification request to a corresponding account server, the verification request including the authentication code, so that the account server performs authentication and returns an verification result, and generate the first user identifier corresponding to the first user if the verification result is that verification succeeds.

In one embodiment, the room entrance module 730 is further configured to return member data of a room member set corresponding to the first room identifier to a terminal of a user corresponding to the room member set, so that the terminal displays member information according to the member data.

In one embodiment, the receiving module 710 is further configured to receive a private message sent by a terminal corresponding to the first user. The private message includes the first user identifier and the second user identifier.

The sending module 720 is further configured to send the private message to a user corresponding to the second user identifier.

In one embodiment, one or more computer non-volatile media storing computer-readable instructions are provided, the computer-readable instructions, when executed by one or more processors, causing the one or more processors to perform the following steps:

receiving a group message sent by a terminal corresponding to a first user, the group message including a first room identifier and a first user identifier, and the first user identifier being a uniform identifier generated when the first user logs in by using a first type account; and sending the group message to a user that corresponds to a room member set corresponding to the first room identifier, the room member set including a second user identifier generated when a second user logs in by using a second-type account.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a non-volatile storage medium such as a magnetic disk, an optical disc, a read-only memory (Read-Only Memory, ROM), or a random access memory (Random Access Memory, RAM).

Technical features of the embodiments discussed above may be combined arbitrarily, and to simplify the description, not all possible combinations of the technical features of the foregoing embodiments are described. However, combinations of these technical features should be considered within the recording scope of the specification only if no contradiction exists in the combinations.

The described embodiments are merely some embodiments of this application, which are specifically described in detail. However, it should not be understood as a limitation to the protection scope of the present disclosure. It should be noted that, persons of ordinary skill in the art may further make some variations and improvements without departing from the concept of this application, and the variations and improvements belong to the protection scope of this application. Therefore, the protection scope of this application shall be subject to the protection scope of the appended claims.

What is claimed is:

1. A method for messaging, comprising:
receiving, by a messaging platform server, a group message sent from a terminal device that is used by a first user, the group message including a first group identifier for identifying a group of users on the messaging platform server and a first user identifier for identifying the first user, and the first user identifier being generated by the messaging platform server after a verification of a first authentication code obtained from a first account server when the first user logs in the messaging platform server by using a first-type account associated with the first account server and the first authentication code obtained from the first account server;
determining the group of users to receive the group message based on the first group identifier; and
sending the group message to the group of users on the messaging platform server based on the first group identifier including at least a second user identifier of a second user, the second user identifier being generated by the messaging platform server after a verification of a second authentication code obtained from a second account server when the second user logs in the messaging platform server by using a second-type account associated with the second account server and the second authentication code obtained from the second account server.

2. The method according to claim 1, wherein before the step of receiving the group message sent from the terminal device that is used by the first user, the method further comprises:
receiving a first message with the first user identifier;
obtaining the first group identifier;
adding the first user corresponding to the first user identifier to the group of users; and
sending the first group identifier to the terminal device that is used by the first user.

3. The method according to claim 1, wherein before the step of receiving the group message sent from the terminal device that is used by the first user, the method further comprises:
receiving a first login request of the first user that logs in the messaging platform server for a first messaging service;
generating the first user identifier for identifying the first user according to the first login request;
sending the first user identifier to the terminal device that is used by the first user to log in the messaging platform server;
receiving a second login request of the second user that logs in the messaging platform server for a second messaging service;
generating the second user identifier for identifying the second user according to the second login request;
sending the second user identifier to another terminal device that is used by the second user to log in the messaging platform server;
receiving a second message with the second user identifier;
obtaining the first group identifier;
adding the second user corresponding to the second user identifier to the group of users; and
sending the first group identifier to the other terminal device.

4. The method according to claim 3, wherein the step of generating the first user identifier for identifying the first user according to the first login request comprises:
obtaining the first authentication code corresponding to the first-type account;
sending a verification request to the first account server for the first messaging service, the verification request including the first authentication code;
receiving a verification result from the first account server that performs verification based on the verification request; and
generating the first user identifier for identifying the first user when the verification result is indicative of a verification success.

5. The method according to claim 3, wherein after the steps of sending the first user identifier to the terminal device and the sending the first group identifier to the other terminal device, the method further comprises:
sending member data of the group of users that is identified by the first group identifier to one or more terminal devices that are used by the group of users for the one or more terminal devices to display member information according to the member data.

6. The method according to claim 1, wherein the method further comprises:
receiving a private message sent by the terminal device that is used by the first user, the private message including the first user identifier and the second user identifier; and
sending the private message to the second user corresponding to the second user identifier.

7. An information processing apparatus, comprising:
interface circuitry configured to receive a group message sent from a terminal device that is used by a first user, the group message including a first group identifier for identifying a group of users on a messaging platform server and a first user identifier for identifying the first user, and the first user identifier being generated by the messaging platform server, after a verification of a first authentication code obtained from a first account server when the first user logs in the messaging platform server by using a first-type account associated with the first account server and the first authentication code obtained from the first account server;
processing circuitry configured to:
determine the group of users to receive the group message based on the first group identifier; and
send, via the interface circuitry, the group message to the group of users on the messaging platform server based on the first group identifier including at least a second user identifier of a second user, the second user identifier being generated by the messaging platform server after a verification of a second authentication code obtained from a second account server when the second user logs in the messaging platform server by using a second-type account associated with the second account server and the second authentication code obtained from the second account server.

8. The information processing apparatus according to claim 7, wherein:
the interface circuitry is configured to receive a first message with the first user identifier; and the processing circuitry is configured to:
obtain the first group identifier;
add the first user corresponding to the first user identifier to the group of users that is identified by the first group identifier; and
send the first group identifier to the terminal device that is used by the first user via the interface circuitry.

9. The information processing apparatus according to claim 8, wherein the processing circuitry is configured to:
receive, via the interface circuitry, a first login request of the first user that logs in the messaging platform server using the first-type account of a first messaging service;
generate the first user identifier for identifying the first user according to the first login request;
send the first user identifier to the terminal device that is used by the first user to log in the messaging platform server;
receive a second login request of the second user that logs in the messaging platform server using the second-type account of a second messaging service;
generate the second user identifier for identifying the second user according to the second login request;
send the second user identifier to another terminal device that is used by the second user to log in the messaging platform server;
receive a second message with the second user identifier;
obtain the first group identifier;
add the second user corresponding to the second user identifier to the group of users that is identified by the first group identifier; and
send the first group identifier to the other terminal device.

10. The information processing apparatus according to claim 9, wherein the processing circuitry is configured to:
obtain the first authentication code corresponding to the first-type account;
send, via the interface circuitry, a verification request to the first account server for the first messaging service, the verification request including the first authentication code;
receive a verification result from the first account server that performs verification based on the verification request; and
generate the first user identifier for identifying the first user when the verification result is indicative of a verification success.

11. The information processing apparatus according to claim 9, wherein the interface circuitry is configured to:
send member data of the group of users that is identified by the first group identifier to one or more terminal devices that are used by the group of users for the one or more terminal devices to display member information according to the member data.

12. The information processing apparatus according to claim 7, wherein the processing circuitry is configured to:
receive, via the interface circuitry, a private message sent by the terminal device that is used by the first user, the private message including the first user identifier and the second user identifier; and
send the private message to the second user corresponding to the second user identifier.

13. A non-transitory computer-readable medium storing instructions which when executed by a computer causes the computer to perform a method for messaging, the method comprising:
receiving a group message sent from a terminal device that is used by a first user, the group message including a first group identifier for identifying a group of users on the messaging platform server and a first user identifier for identifying the first user, and the first user identifier being generated by a messaging platform server after a verification of a first authentication code obtained from a first account server when the first user logs in the messaging platform server by using a first-type account associated with the first account server and the first authentication code obtained from the first account server;
determining the group of users to receive the group message based on the first group identifier; and
sending the group message to the group of users on the messaging platform server based on the first group identifier including at least a second user identifier of a second user, the second user identifier being generated by the messaging platform server after a verification of a second authentication code obtained from a second account server when the second user logs in the messaging platform server by using a second-type account associated with the second account server and the second authentication code obtained from the second account server.

14. The non-transitory computer-readable medium according to claim 13, wherein before the step of receiving the group message sent from the terminal device that is used by the first user, the method further comprises:
receiving a first message with the first user identifier;
obtaining the first group identifier;
adding the first user corresponding to the first user identifier to the group of users; and
sending the first group identifier to the terminal device that is used by the first user.

15. The non-transitory computer-readable medium according to claim 13, wherein before the step of receiving the group message sent from the terminal device that is used by the first user, the method further comprises:
receiving a first login request of the first user that logs in the messaging platform server using the first-type account for a first messaging service;
generating the first user identifier for identifying the first user according to the first login request;
sending the first user identifier to the terminal device that is used by the first user to log in the messaging platform server;
receiving a second login request of the second user that logs in the messaging platform server by using the second-type account for a second messaging service;
generating the second user identifier for identifying the second user according to the second login request;
sending the second user identifier to another terminal device that is used by the second user to log in the messaging platform server;
receiving a second message with the second user identifier;
obtaining the first group identifier;
adding the second user corresponding to the second user identifier to the group of users; and
sending the first group identifier to the other terminal device.

16. The non-transitory computer-readable medium according to claim 15, wherein the step of generating the first user identifier for identifying the first user according to the first login request comprises:
obtaining the first authentication code corresponding to the first-type account;

sending a verification request to the first account server for the first messaging service, the verification request including the first authentication code;

receiving a verification result from the first account server that performs verification based on the verification request; and generating the first user identifier for identifying the first user when the verification result is indicative of a verification success.

17. The non-transitory computer-readable medium according to claim 15, wherein after the steps of sending the first user identifier to the terminal device and sending the first group identifier to the other terminal device, the method further comprises:

sending member data of the group of users that is identified by the first group identifier to one or more terminal devices that are used by the group of users for the one or more terminal devices to display member information according to the member data.

18. The non-transitory computer-readable medium according to claim 13, wherein the method further comprises:

receiving a private message sent by the terminal device that is used by the first user, the private message including the first user identifier and the second user identifier; and sending the private message to the second user corresponding to the second user identifier.

\* \* \* \* \*